(12) United States Patent
Dickens et al.

(10) Patent No.: US 8,621,479 B2
(45) Date of Patent: Dec. 31, 2013

(54) SYSTEM AND METHOD FOR SELECTING TASK ALLOCATION METHOD BASED ON LOAD BALANCING AND CORE AFFINITY METRICS

(75) Inventors: Thomas P. Dickens, Renton, WA (US); David Christian Caccia, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 13/344,474

(22) Filed: Jan. 5, 2012

(65) Prior Publication Data

US 2013/0179891 A1 Jul. 11, 2013

(51) Int. Cl.
*G06F 9/46* (2006.01)

(52) U.S. Cl.
USPC .......................................... 718/104; 718/105

(58) Field of Classification Search
None
See application file for complete search history.

(56) References Cited

U.S. PATENT DOCUMENTS

| | | | |
|---|---|---|---|
| 5,872,972 A | 2/1999 | Boland et al. | |
| 7,441,101 B1 | 10/2008 | Steiss et al. | |
| 7,895,415 B2 | 2/2011 | Gonzalez et al. | |
| 2003/0037091 A1* | 2/2003 | Nishimura et al. | 709/103 |
| 2004/0054999 A1 | 3/2004 | Willen | |
| 2005/0102677 A1 | 5/2005 | Gootherts | |
| 2007/0050771 A1* | 3/2007 | Howland et al. | 718/102 |
| 2007/0283352 A1* | 12/2007 | Degenhardt et al. | 718/100 |
| 2008/0046895 A1 | 2/2008 | Dillenberger et al. | |
| 2008/0163174 A1 | 7/2008 | Krauss | |
| 2009/0187915 A1 | 7/2009 | Chew et al. | |
| 2009/0204948 A1 | 8/2009 | Krauss | |
| 2011/0219377 A1 | 9/2011 | Gowda | |

OTHER PUBLICATIONS

Extended European Search Report for Application No. 12198684.8; Jun. 6, 2013; 6 pages.

* cited by examiner

*Primary Examiner* — Abdullah Al Kawsar
*Assistant Examiner* — James J Lee
(74) *Attorney, Agent, or Firm* — Armstrong Teasdale LLP

(57) ABSTRACT

Systems and methods for performing a task are provided. One example method includes if the task allocation metric indicates load balancing associated with the processor is below a first threshold, determining whether the task is a reentrant task, if the task is a reentrant task, determining whether a stopping criteria is satisfied, re-entering the task into a queue of tasks if the stopping criteria is not satisfied and the task is a reentrant task, if the task allocation metric indicates core affinity associated with the at least one processor is below a second threshold, determining whether the task is a main task, if the task is not a main task, determining whether a stopping criteria is satisfied, and if the stopping criteria is satisfied and the task is not a main task, pulling a parent task associated with the task into the thread.

17 Claims, 3 Drawing Sheets

SYSTEM AND METHOD FOR SELECTING TASK ALLOCATION METHOD BASED ON LOAD BALANCING AND CORE AFFINITY METRICS

BACKGROUND

The field of the disclosure relates generally to systems and methods for use in performing a task by at least one processing engine.

Processors are generally known to perform tasks through use of threads provided by operating systems associated with the processors. The thread performs tasks as generated by the operating system or from a queue of tasks to be performed to accomplish one or more calculations, operations, processes, actions and/or procedures in the computing environment.

Often, the operating systems provide multiple threads, which are assigned various different tasks to be performed thereby. Known operating systems assign tasks to threads to perform the tasks. In various implementations, a task may be dependent on one or more other tasks, or subtasks. When the task is assigned to the thread, the task occupies the thread until all necessary dependent tasks and/or subtasks are complete, so that the thread may perform that task. When a task is separated into multiple tasks, which are themselves separated into multiple tasks, one or more tasks may be assigned to threads for an extended period of time, while the dependent tasks are performed. The time, in which the task or subtask is assigned to a thread, and waiting for other tasks to be completed, often results in inefficient use of the processor, and in some instances, thread starvation.

BRIEF DESCRIPTION

In one aspect, a method for use in performing a task by at least one processing engine is provided. The method includes determining a task allocation metric associated with at least one processor having at least one processing engine. The at least one processing engine has one or more threads. The method further includes assigning the task to one of the one or more threads and, if the task allocation metric indicates load balancing associated with the at least one processor is below a first threshold, determining, by the at least one processing engine, whether the task is a reentrant task previously assigned to any of the one or more threads associated with the at least one processing engine. The method also includes, if the task is a reentrant task, determining, by the at least one processing engine, whether a stopping criteria is satisfied, re-entering the task into a queue of tasks associated with the at least one processing engine if the stopping criteria is not satisfied and the task is a reentrant task. The method includes if the task allocation metric indicates core affinity associated with the at least one processor is below a second threshold, determining, by the at least one processing engine, whether the task is a main task, if the task is not a main task, determining, by the at least one processing engine, whether a stopping criteria is satisfied, and if the stopping criteria is satisfied and the task is not a main task, pulling a parent task associated with the task into the one of the one or more threads.

In another aspect, a computing device for use in performing a task is provided. The computing device includes a memory device for storing a queue of tasks and a processor associated with the memory device and including at least one processing engine having one or more threads. The at least one processing engine including a task manager and a queue manager configured to manage said queue of tasks. The task manager is configured to determining a task allocation metric associated with said processor and assign the task to one of the one or more threads. The task manager is configured to, if the task allocation metric indicates load balancing associated with said processor is below a first threshold, determine whether the task is a reentrant task previously assigned to any of said one or more threads, if the task is a reentrant task, to determine whether a stopping criteria is satisfied, and to re-enter, via said queue manager, the task into a queue of tasks if the stopping criteria is not satisfied and the task is a reentrant task. The task manager is configured to, if the task allocation metric indicates core affinity associated with said processor is below a second threshold, to determine whether the task is a main task, if the task is not a main task, to determine whether a stopping criteria is satisfied, and if the stopping criteria is satisfied and the task is not a main task, to pull a parent task associated with the task into said one of the one or more threads.

The features, functions, and advantages that have been discussed can be achieved independently in various embodiments or may be combined in yet other embodiments further details of which can be seen with reference to the following description and drawings.

DETAILED DESCRIPTION

The subject matter described herein relates generally to systems and methods for use in performing one or more tasks having multiple subtasks, while managing a queue of tasks and conserving threads associated with one or more processing engines for performing the tasks.

In some embodiments, technical effects of the methods, systems, and computer-readable media described herein include at least one of: (a) determining a task allocation metric associated with at least one processor having at least one processing engine, the at least one processing engine having one or more threads, (b) assigning the task to one of the one or more threads, (c) if the task allocation metric indicates load balancing associated with the at least one processor is below a first threshold, determining, by the at least one processing engine, whether the task is a reentrant task previously assigned to any of said one or more threads associated with the at least one processing engine, (d) if the task is a reentrant task, determining, by the at least one processing engine, whether a stopping criteria is satisfied, (e) re-entering the task into a queue of tasks associated with the at least one processing engine if the stopping criteria is not satisfied and the task is a reentrant task, (f) if the task allocation metric indicates core affinity associated with the at least one processor is below a second threshold, determining, by the at least one processing engine, whether the task is a main task, (g) if the task is not a main task, determining, by the at least one processing engine, whether a stopping criteria is satisfied, and (h) if the stopping criteria is satisfied and the task is not a main task, pulling a parent task associated with the task into said one of the one or more threads.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
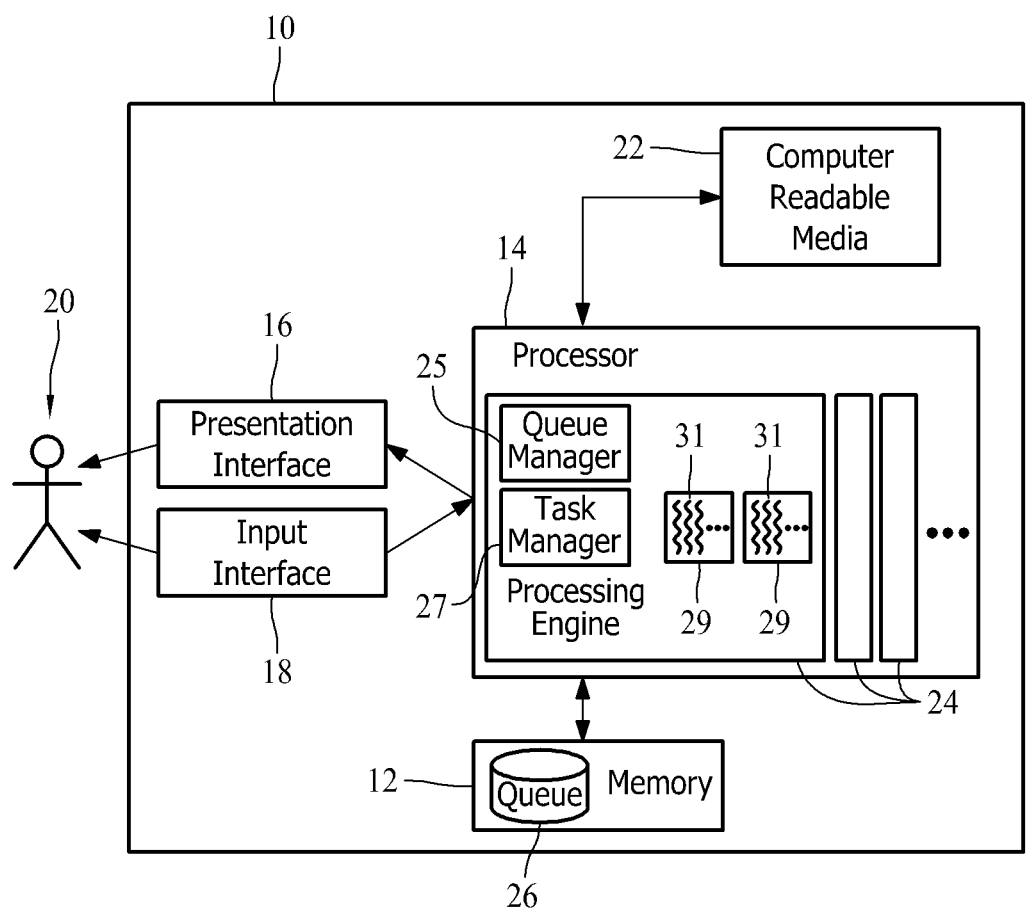
FIG. 1 is a block diagram of an exemplary computing device, that may be use to perform one or more tasks.

FIG. 1 is a block diagram of an exemplary computing device 10. In the exemplary embodiment, computing device 10 includes a memory 12 and a processor 14 that is coupled to memory 12 for executing programmed instructions. Processor 14 may include one or more processing engines (e.g., in a multi-core configuration). Computing device 10 is programmable to establish one or more processing engines at processor 14 to perform one or more operations described herein. For example, processor 14 may be programmed by encoding an operation as one or more executable instructions and providing the executable instructions in memory 12.

Processor 14 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 14, cause processor 14 to perform at least a portion of the methods described herein. The above examples are exemplary only, and thus are not intended to limit in any way the definition and/or meaning of the term processor.

Memory 12, as described herein, is one or more devices that enable information such as executable instructions and/or other data to be stored and retrieved. Memory 12 may include one or more computer-readable media, such as, without limitation, cache, dynamic random access memory (DRAM), static random access memory (SRAM), a solid state disk, and/or a hard disk. As shown, memory 12 includes a queue 26 for storing one or more tasks to be performed. Memory 12 may further be configured to store, without limitation, operating instruction, firmware, software, subtasks counters, idle tasks, and/or any other type of data suitable for use with the methods and systems described herein. Moreover, while memory 12 and processor 14 are illustrated as separate, it should be appreciated that an integrated device including processor 14 and memory 12 may be used in several computing device embodiments.

In the exemplary embodiment, computing device 10 includes a presentation interface 16 that is coupled to processor 14. Presentation interface 16 outputs (e.g., display, print, and/or otherwise output) information such as, but not limited to, installation data, configuration data, test data, error messages, and/or any other type of data to a user 20. For example, presentation interface 16 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 16 includes more than one display device.

In the exemplary embodiment, computing device 10 includes an input interface 18 that receives input from user 20. In the exemplary embodiment, input interface 18 is coupled to processor 14 and may include, for example, a keyboard, a reader, a pointing device, a mouse, a stylus, a touch sensitive panel (e.g., a touch pad or a touch screen), a gyroscope, an accelerometer, and/or an audio input interface.

Instructions for operating systems and applications are located in a functional form on non-transitory memory 12 for execution by processor 14 to perform one or more of the processes described herein. These instructions in the different embodiments may be embodied on different physical or tangible computer-readable media, such as memory 12 or another memory, such as a computer-readable media 22, which may include, without limitation, a flash drive, CD-ROM, thumb drive, floppy disk, etc.

Further, instructions are located in a functional form on non-transitory computer-readable media 22, which may include, without limitation, a flash drive, CD-ROM, thumb drive, floppy disk, etc. Computer-readable media 22 is selectively insertable and/or removable from computing device 10 to permit access and/or execution by processor 14. In one example, computer-readable media 22 includes an optical or magnetic disc that is inserted or placed into a CD/DVD drive or other device associated with memory 12 and/or processor 14. In some instances, computer-readable media 22 may not be removable.

Computing device 10 may be embodied in a variety of processing environments for performing as described herein. Specifically, for example, computing device 10 can include, without limitation, one or more of a personal computer, an embedded system, a workstation, a server, a server system, a network computer, a portable computer (e.g., an iPad), a smartphone, a tablet, and/or other device suited to perform one or more operations. It should be appreciated that the computer device 10 herein may be provided by one or more combinations of processing systems and/or devices.

Generally, processor 14 is provided to perform one or more tasks. Each task can include multiple subtasks, and each subtask can further include subtasks. In this manner, a task can be broken down into subtasks, which may be performed by a processing engine. Use of the term "task" herein may be in reference to either or both of a task and a subtask. Further, hierarchical terms (e.g., parent or main) may be used in combination with task to indicate a relation of one task to one or more other tasks. As shown in FIG. 1, in the exemplary embodiment, processor 14 provides in software, firmware or hardware one or more processing engines 24. One or more of processing engines 24 includes a queue manager 25 and a task manager 27.

In the exemplary embodiment, the queue manager 25 is configured to manage the movement of tasks into and output of queue 26, while task manager 27 is configured to determine by which method a task is performed and/or processed once in a thread, as described with reference to FIGS. 2 and 3, below. Each processing engine 24 includes one or multiple processing cores 29 having one or multiple threads 31 per processing core 29, which provided by the software and/or firmware. Task managers 27 serve to assign the tasks and/or subtasks from queue 26 to one or more of the threads 31, as described herein, for performance of the particular task(s).

In the exemplary embodiment, task manager 27 is configured to determine a task allocation metric based on a core affinity threshold and/or a load balancing threshold. More specifically, task manager 27 may determine one or more task allocation metric based on the current condition of processor 14 and/or a condition of processor 14 predicted from one or more next tasks to be processed from the queue 26, as indicated by queue manager 25. Further, task manager 27 may compare the task allocation metric based on the current and/or predicted condition to the core affinity threshold and/or the load balancing threshold. Based on the comparison, task manager 27 may assign the next task to a specific processing engine 24 as a function of the core affinity threshold, or alternatively to another one of the processing engines 24 as a function of the load balancing threshold. Additionally, or alternatively, task manager 27 may assign the next task based on whether the next task is a reentrant task and/or a task that can be divided into subtasks.

In this manner, task manager 27 may predicatively and/or in real-time control allocation of tasks to the available processing engines 24, as a function of the type of tasks being managed by the queue manager 25 (e.g., reentrant task, main task) and executed by processing engines 24. The core affinity and/or load balancing capability herein further enables more efficient execution of tasks across available processing engines 24, as compared to known methods, while providing load balancing among one or more processing engines 24.

Figure 2:
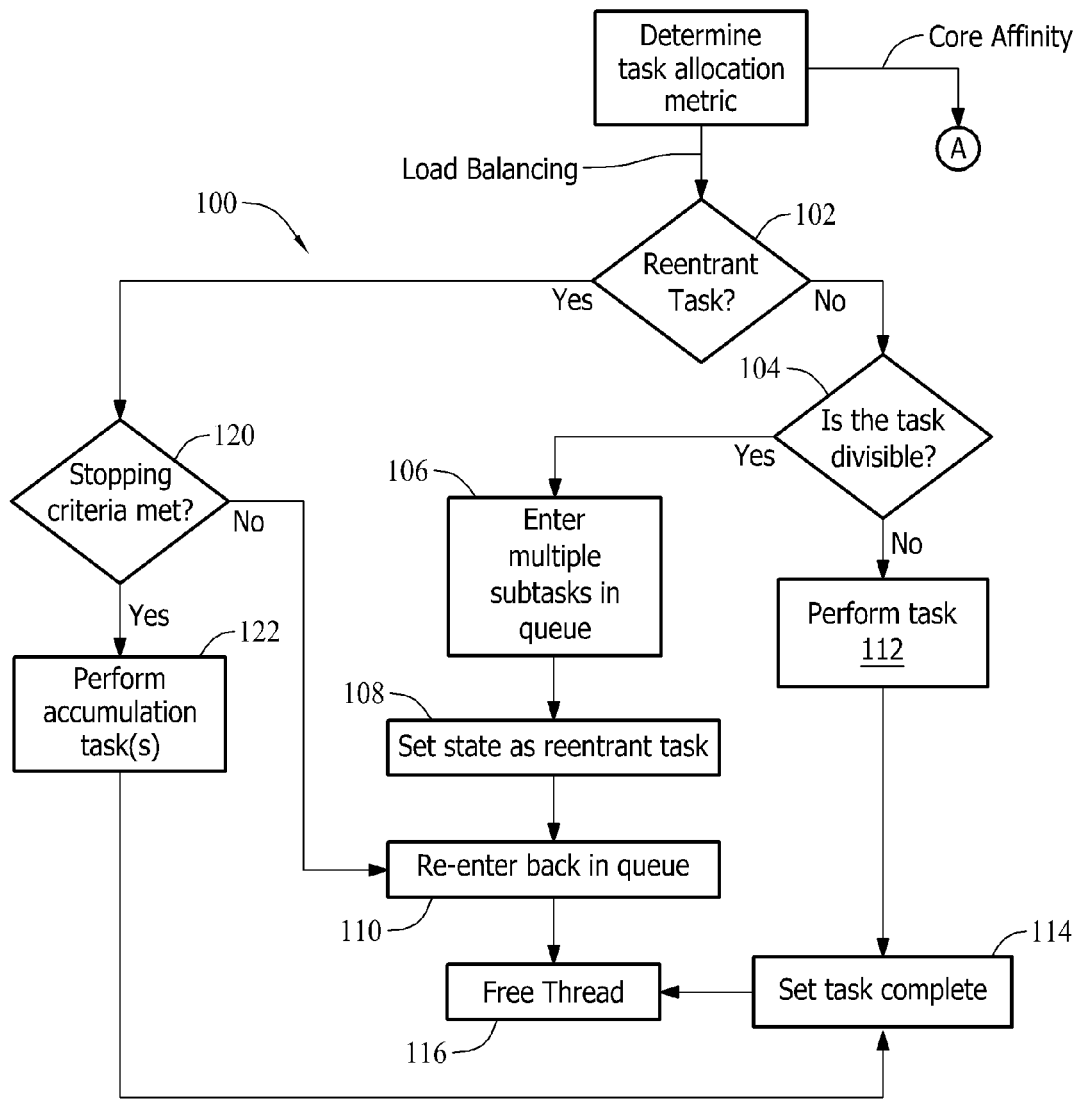
FIG. 2 illustrates a flow diagram of an exemplary method for used in performing one or more tasks
Figure 3:
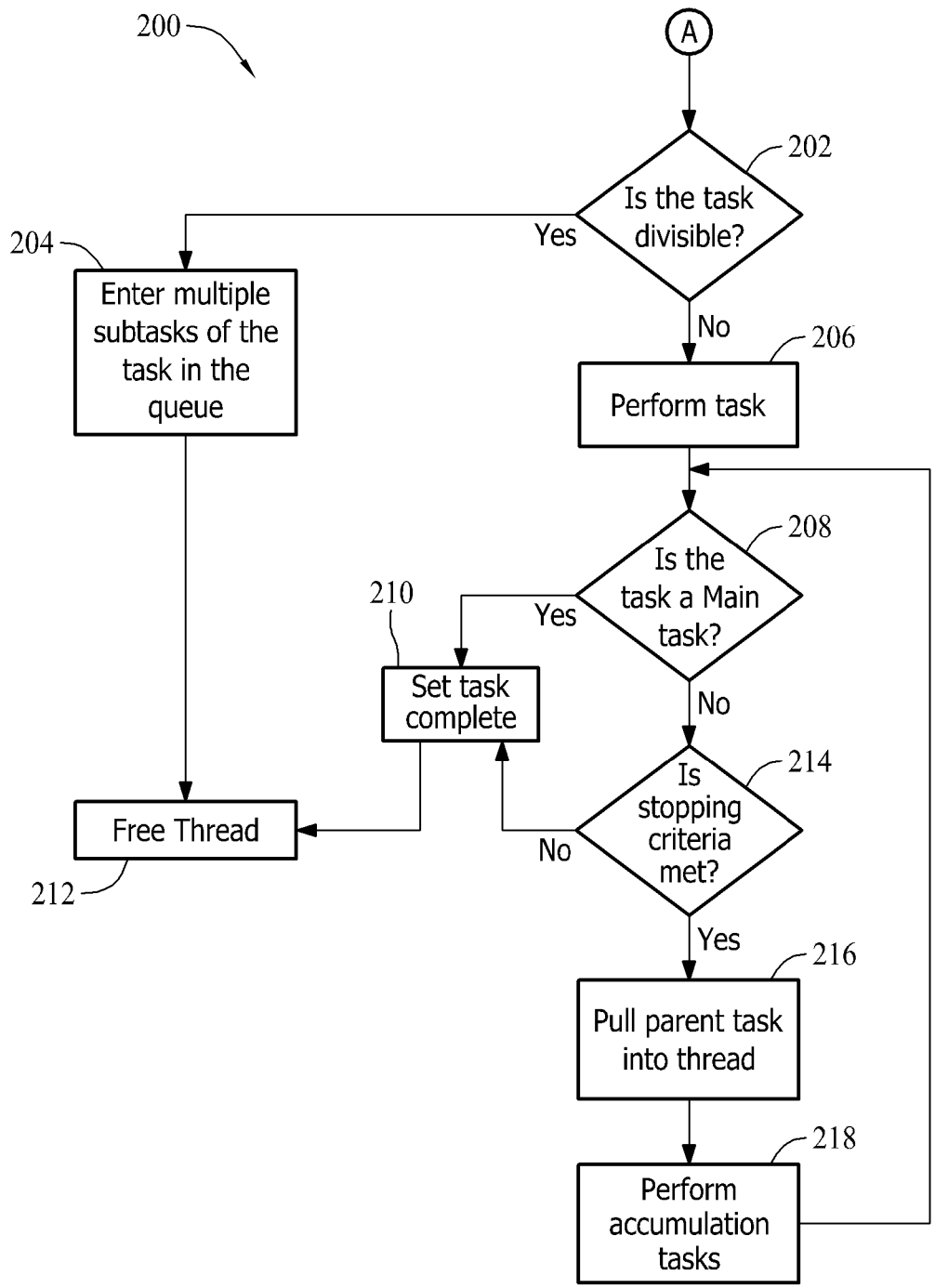
FIG. 3 illustrates a flow diagram of another exemplary method for use in performing one or more tasks, which may be used with the exemplary method of FIG. 2.

FIG. 2 illustrates an exemplary method 100 for use in performing one or more tasks. The methods described herein include at least one step and/or process performed by at least one processing engine associated with processor 14. In the exemplary embodiment of FIG. 2, for example, method 100 is performed by processing engine(s) associated with processor 14, as provided in one or more computing devices 10.

When a task is generated within the computing device 10, the task is entered into a position in queue 26. Queue 26 is a first-in, first-out (FIFO) queue, such that tasks are assigned to threads 31 as threads 31 become available in the order the tasks where entered into the queue 26. It should be understood that other types of queues 26 (e.g., a last-in-first-out (LIFO) queue or other non-FIFO queues) and/or the interactions with the one or more threads, and multiple queues may be used in other embodiments. It should be further appreciated that while the queue 26 is illustrated as within memory 12, as described above, the queue may be included in memory 12 and internal or external to processor 14.

When method 100 is initiated, a task allocation metric associated with processor 14 is determined 101, by the processing engine 24 or another processing resource within processor 14. The task allocation metric may be indicative of, for example, load balancing, core affinity, or other metric related to allocation/performance of one or more task within threads included in the processing engines 24. In determining 101 the task allocation metric, processing engine 24 may compare the metric to one or more thresholds to determined if a core affinity and/or load balancing associated with processor 14 is sufficient, insufficient, optimal, or not-optimal to achieve one or more different desired performances of processor 14.

For example, the task allocation metric may include a number of reads and/or writes to memory. A threshold may be a number of reads and/or writes to memory 12, such that when the actual number of reads and/or writes to memory 12 exceeds a first predetermined number, core affinity associated with processor 14 is below a second threshold. Conversely, if the actual number of reads and/or writes to memory 12 is less than a second predetermined number (the same or different than the first predetermined number) or it a core of processor 14 is idle, load balancing associated with processor 14 is below a first threshold. A variety of other characteristics and/or performances of processor 14 may provide a task allocation metric indicative of core affinity and/or load balancing in other embodiments.

If the task allocation metric indicates load balancing associated with the at least one processor 14 is below a first threshold, for example, the tasks manager 27 assigns a task to the thread for processing. Upon receipt of the task, the thread operates to determine 102 whether the task is a reentrant task previously assigned to any one of the plurality of threads. As in this exemplary embodiment, the term "reentrant" task refers to a task that has previously been assigned to a thread of processing engine 24 and has been subject to the one or more other steps of the method 100 described herein.

As shown in FIG. 2, if the task is not a reentrant task, method 100 proceeds to determine 104 if the task is divisible into multiple subtasks. The task may be divisible based one or more different criteria, such as the relation of operation within the task, the number of operations within task, the complexity of operations within the task, etc. In some embodiments, the divisibility of the task may further be implicated by the type and/or capacity of threads, processing engines 24 and/or processor 14 used.

If the task is divisible, the thread enters 106 the multiple subtasks of the task into the queue 26. After the subtasks are entered into the queue 26, the thread sets 108 a state indicating that the task has been assigned to a thread. Moreover, the thread re-enters 110 the task into the queue 26 for subsequent processing, and frees 116 the thread for other tasks. If the thread determined 104 the task is not divisible, the thread will perform 112 the task. After the task is performed, the thread sets 114 a state of the task as complete and frees 116 the thread for use by one or more other tasks.

Further, because the task is re-entered into the queue 26, the thread is free to complete other tasks associated or un-associated with the re-entered tasks. Accordingly, method 100 differs from known methods by freeing up the thread, rather than permitting the tasks to remain in the thread until complete. In one or more embodiments, method 100 may be employed to reduce, limit, and/or eliminate thread starvation, deadlock, and/or livelock within a processing engine 24, processor 14, and/or computing device 10. Moreover, as should be appreciated, because method 100 finishes with at step 116, i.e., freeing the thread, method 100 and other methods herein are suited to perform various complexity of tasks efficiently within allocated resources within processor 14. In at least one embodiment, processing engine 24 includes a single thread to perform multiple tasks, with at least one task having multiple subtasks.

Referring again to FIG. 2, if the thread determined 102 that the task has been previously assigned to a thread (e.g., indicated by the task's state, set at step 108), the thread determines 120 if a stopping criteria has been satisfied. The stopping criteria, for example, may include one, some, a percentage, and/or all of subtasks associated with a task that has been completed, or that certain tasks associated with the task are completed. In at least one embodiment, when a task is divided into multiple subtasks and entered 106 into the queue 26, a subtask counter is generated, which can be decremented each time one of the subtasks is complete. In such an embodiment, the stopping criteria can include when the subtask counter equals zero, i.e., each of multiple subtasks subordinate to the task is complete. In some examples, the stopping criteria can include when at least one of multiple subtasks are completed. In various embodiments, a variety of different criteria may be provided indicating that a minimal amount of processing has been accomplished to move forward with a task. In other embodiment, other criteria may be used to determine that an appropriate level of completion has been reached and/or that the task has been completely performed. It should be appreciated that stopping criteria may vary based on the type of tasks performed and/or one or more parameters associated with the manner in which the task is to be performed (e.g., precision).

When the stopping criteria is not met, the thread re-enters 110 the task into the queue 26 for subsequent processing, thereby freeing the thread for other tasks. Otherwise, when the stopping criteria is met, the thread optionally performs 122 one or more accumulation tasks associated with the task. For example, an accumulation task may include, without limitation, operating on the results of multiple completed subtasks, such as summing multiple results. In at least one embodiment, no accumulation tasks are performed at step 122. Upon completion of the accumulation tasks, if needed, the thread sets 114 a state of the task as complete and frees 116 the thread for use by one or more other tasks.

Method 100 illustrated in FIG. 2 provides processing of tasks by processing engine by freeing thread from idle tasks waiting on other tasks to be completed. Method 100 may be used to assign thousands, hundreds of thousand, millions, or more tasks and/or subtasks to processing engine 24 to complete tasks more quickly and more efficiently than known methods. In the exemplary embodiment, method 100 further provides improved load balancing among several threads, because a thread is freed and assigned a next task from the queue 26 without regard for the type or relation of the task to other tasks. As such, method 100 emphasizes enhanced load balancing among several processing engines 24, which may provided reduced emphasis on core affinity for processing engines 24 in one or more embodiments.

Furthermore, in various, because each thread is either processing a task, or moving the task into the queue 26, methods herein efficiently utilize threads, such that fewer threads (e.g., a single thread) can be used to perform tasks that would cause issues (e.g., thread starvation, deadlock, and/or livelock) in known processing methods.

If the task allocation metric indicates core affinity associated with the at least one processor 14 is below a second threshold, as determined 101 within method 100, the processing engine 24 branches, at node A, to the exemplary method 200 for use in performing one or more tasks. The exemplary method 200 is illustrated in FIG. 3.

Similar to method 100, when a task is generated within the computing device 10, the task is entered into a position in queue 26. Queue 26 is a first-in, first-out (FIFO) queue, such that tasks are assigned to threads as threads become available in the order the tasks where entered into the queue 26. As noted above, it should be understood that other types of queues 26 and/or the interactions with threads may be used in other embodiments. When a thread of a processing engine 24 becomes available, the task is assigned to the thread for processing. In the exemplary embodiment of FIG. 3, upon receipt of the task, the thread operates to determine 202 whether the task is divisible into multiple subtasks. As indicated above, tasks may be divisible based on one or more different criteria, such as, for example, the relation of operation within the task, the number of operations within task, etc.

If the task is divisible, the thread enters 204 the multiple subtasks of the task into the queue 26, and freeing 212 the thread to perform other tasks.

Conversely, if the task is not divisible, the thread performs 206 the task, and determines 208 whether the task is a main task. As used herein, the term "main task" refers to tasks that have at least one subtask, but are not subtasks to other tasks. If the task is determined to be a main task, the thread determines the task is complete, sets 210 the state of the task as complete, and frees 212 the thread to perform other tasks. If, however, the task is not a main task, the thread determines 214 whether the stopping criteria for the parent task have been met. As indicated above, a stopping criteria may be a value of a subtask counter, generated when a task is divided into multiple subtasks, or various other measures of completion of the task or subtasks.

If the stopping criteria for the parent task is not met, the thread determines the task is complete, sets 210 the state of the task as complete, and frees 212 the thread to perform other tasks.

Conversely, if the stopping criteria for the parent task is met, the processing engine 24 pulls 216 the parent task into the thread and performs 218 accumulation tasks associated with the parent task, as needed. Upon completion of the accumulation tasks, if any, the thread loops back to determine 208 whether the parent task is a main task. The processes described herein continues until the main task is determined to be complete, and the thread is freed 212. By pulling the parent task into the thread, after performing the task, method 200 emphasizes enhanced core affinity over known methods of performing a task with multiple subtasks, and may provide reduced emphasis on load balancing between the processing engines 24 in one or more embodiments. More specifically, subtasks, or tasks beneath a parent task, are substantially performed by the same thread so that related tasks of a main task are more likely to be performed in the same processing engine 24, as compared to known methods.

Moreover, by freeing 212 the thread from idle tasks waiting on other tasks to be completed, prior to the stopping criteria being met, method 200 can complete tasks more quickly and more efficiently than known methods. In this manner, each thread is either processing a task or moving the task into the queue 26, such that processing engine 24 efficiently utilizes its one or more threads.

Such efficient utilization provides that fewer threads can be used to perform tasks that would cause issues (e.g., thread starvation, deadlock, and/or livelock) in known processing methods. In this manner, the methods described herein may be used in particular processing environments with a limited number of threads and/or other processing environments in which efficiency is preferred, while limiting and/or eliminating the potential for thread starvation, deadlock, and/or livelock conditions.

It should be appreciated that while method 100 and method 200 are described herein in conjunction with one another, one or both of the methods, and/or permutations thereof, may be used separated in various other embodiments. For example, in a computing device where load balancing is a controlling design consideration, method 100 may be employed, alone and not in combination with method 200. In another example, in a computing device where core affinity is a controlling design consideration, method 200 may be employed, alone and not in combination with method 100. In such embodiments, the step for determining a task allocation metric may be modified or omitted.

Moreover, it should be appreciated that one or more aspects of the present disclosure transform a general-purpose computing device into a special-purpose computing device when configured to perform the functions, methods, and/or processes described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for use in performing a task by at least one processing engine, said method comprising:
    determining a task allocation metric associated with at least one processor having at least one processing engine, the at least one processing engine having a plurality of processing cores, each processing core having one or more threads, wherein the task includes a plurality of subtasks;
    assigning the task to one of the one or more threads and performing task allocation according to the task allocation metric indicating a task should be performed using either (a) a load balancing method or (b) a core affinity method;
    performing a load balancing method if the task allocation metric indicates load balancing associated with the at least one processor is below a first threshold, the load balancing method including:
        determining by the at least one processing engine whether the task is a reentrant task, wherein the task is a reentrant task if the task has been previously assigned to any of said one or more threads associated with the at least one processing engine;
        if the task is a reentrant task, determining, by the at least one processing engine, whether a stopping criteria is satisfied, wherein the stopping criteria includes determining whether some or all of the subtasks subordinate to the task are completed; and
        if the stopping criteria is not satisfied and the task is a reentrant task, freeing said one of the one or more threads after re-entering the task into a queue of tasks associated with the at least one processing engine;
    performing a core affinity method if the task allocation metric indicates core affinity associated with the at least one processor is below a second threshold, wherein the core affinity method includes:
        determining, by the at least one processing engine, whether the task is a main task, wherein the main task is a task having at least one subtask, but is not a subtask to other tasks;
        if the task is not a main task, determining, by the at least one processing engine, whether the stopping criteria is satisfied; and
        if the stopping criteria is satisfied and the task is not a main task, assigning a parent task of the task to said same one of the one or more threads.

2. The method of claim 1, further comprising determining whether the task is divisible into a plurality of subtasks if the task is not a reentrant task.

3. The method of claim 2, further comprising entering, by the at least one processing engine, the plurality of subtasks of the task into the queue if the task is divisible.

4. The method of claim 1, further comprising performing, by the at least one processing engine, at least one accumulation task if the stopping criteria is satisfied.

5. The method of claim 1, further comprising performing at least one accumulation task associated with the parent task after the parent task is assigned to said one of the one or more threads.

6. The method of claim 1, wherein if the task is not a main task, determining whether the stopping criteria is satisfied includes determining whether each of multiple subtasks subordinate to the task is complete.

7. The method of claim 1, further comprising, if the stopping criteria is not satisfied and task is not a main task, setting a state of the task as complete and freeing said one of the one or more threads after re-entering the task into a queue of tasks.

8. The method of claim 1, further comprising determining whether the task is divisible into a plurality of subtasks, prior to determining whether the task is a main task.

9. The method of claim 8, further comprising entering the plurality of subtasks of the task into a queue of tasks if the task is divisible.

10. A computing device for use in performing a task, said computing device comprising:
    a memory device for storing a queue of tasks, wherein the task includes a plurality of subtasks; and
    a processor associated with the memory device and including at least one processing engine having a plurality of processing cores, each processing core having one or more threads, said at least one processing engine including a task manager and a queue manager configured to manage said queue of tasks, said task manager configured to determining a task allocation metric associated with said processor and assign the task to one of the one or more threads and performing task assignment according to the task allocation metric indicating a task should be performed using either (a) a load balancing method or (b) a core affinity method;
    wherein said task manager performs a load balancing method, if the task allocation metric indicates load balancing associated with said processor is below a first threshold, and wherein the load balancing determines whether the task is a reentrant task, wherein the task is a reentrant task if the task has been previously assigned to any of said one or more threads, if the task is a reentrant task, to determine whether a stopping criteria is satisfied, wherein the stopping criteria includes determining whether some or all of the subtasks subordinate to the task are completed; and if the stopping criteria is not satisfied and the task is a reentrant task, freeing said one of the one or more threads after re-entering the task, via said queue manager, into a queue of tasks;
    wherein said task manager performs a core affinity method if the task allocation metric indicates core affinity associated with said processor is below a second threshold, wherein the core affinity method determines whether the task is a main task, wherein the main task is a task having at least one subtask, but is not a subtask to other tasks, if the task is not a main task, to determine whether the stopping criteria is satisfied, and if the stopping criteria is satisfied and the task is not a main task, to assign a parent task associated with the task to said same one of the one or more threads.

11. The computing device of claim 10, wherein said task manager is further configured to, if the task is not a reentrant task, determine whether the task is divisible into a plurality of subtasks.

12. The computing device of claim 11, wherein said at least one task manager is further configured to, if the task is divisible, enter the plurality of subtasks of the task, via said queue manager, into the queue.

13. The computing device of claim 12, wherein said task manager is further configured to assign one of the plurality of subtasks to a second one of the one or more threads and to determine whether said one of the plurality of subtasks is a reentrant task.

14. The computing device of claim 10, wherein said task manager is further configured to perform at least one accumulation task when the stopping criteria is satisfied.

15. The computing device of claim 10, wherein said task manager is further configured to determine whether the task is divisible into a plurality of subtasks, prior to determining whether the task is a main task.

16. The computing device of claim 15, wherein said task manager is further configured to, if the task is divisible, enter the plurality of subtasks of the task, via said queue manager, into the queue.

17. The computing device of claim 10, wherein said task manager is further configured to perform at least one accumulation task associated with the parent task, after the parent task is assigned to said same one of the one or more threads.

* * * * *